United States Patent [19]

Wright et al.

[11] 3,872,153

[45] Mar. 18, 1975

[54] PROCESS FOR THE PRODUCTION OF UNSATURATED ORGANIC COMPOUNDS

[75] Inventors: Donald Wright; Samuel Gardner, both of Stockton-on-Tees, England

[73] Assignee: Imperial Chemical Industries Limited, London, England

[22] Filed: Mar. 27, 1972

[21] Appl. No.: 238,611

[30] Foreign Application Priority Data
Apr. 5, 1971 United Kingdom............ 8659/71

[52] U.S. Cl... 260/475 N, 260/410.9 N, 260/475 R, 260/476 R, 260/485 R, 260/485 N, 260/497 A, 260/583 H, 260/612 D, 260/613 D, 260/614 AA, 260/615 R, 260/641
[51] Int. Cl... C07c 69/02, C07c 69/34, C07c 69/80
[58] Field of Search........ 260/475 N, 485 N, 497 A, 260/410.9 N, 476 R

[56] References Cited
UNITED STATES PATENTS
3,221,045   11/1965   McKeon et al. ................ 260/497 A 3,534,088   10/1970   Bryant et al. .................... 260/475 N FOREIGN PATENTS OR APPLICATIONS
1,224,595   3/1971   United Kingdom......... 260/475 N Primary Examiner—Lorraine A. Weinberger
Assistant Examiner—E. Jane Skelly
Attorney, Agent, or Firm—Cushman, Darby & Cushman

[57] ABSTRACT

Compounds containing one or more groups

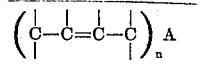

particularly octadienyl esters, are produced by reacting an acyclic conjugated diene such as butadiene with a compound containing one or more nucleophilic groups AH, e.g., a carboxylic acid in the presence of a platinum or iridium compound and a copper compound, the latter minimising the formation of polymer from the diene.

11 Claims, No Drawings

PROCESS FOR THE PRODUCTION OF UNSATURATED ORGANIC COMPOUNDS

The present invention relates to the production of unsaturated organic compounds.

It is known that acyclic conjugated diolefines will react with compounds containing nucleophilic groups HA such as water, alcohols, phenols and carboxylic acids to yield unsaturated products such as alcohols, ethers and esters. Dimerisation of the acyclic conjugated diolefine usually takes place so that the product contains one or more carbon chains of structure

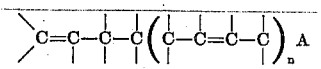

containing at least eight carbon atoms.

We have found that one difficulty attendant on such reactions is polymerisation of the acyclic conjugated diolefine which results in a loss of reactant and formation of unwanted polymer. The present invention provides a means of suppressing this polymer formation.

According to the invention a process for the production of unsaturated compounds containing one or more groups

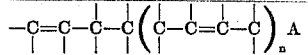

comprises reacting an acyclic conjugated diolefine with a compound containing one or more nucleophilic groups AH in the presence of a platinum or iridium compound and a copper compound.

In the formula

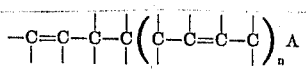

$n$ is a whole number and is preferably 1 or 2, usually the former.

The acyclic conjugated diolefine which is used in the process comprises the basic structure

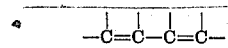

in which the residual valencies may be satisfied by inorganic groups such as halogen or by organic groups or by hydrogen. Preferably the residual valencies are satisfied by alkyl groups particularly lower alkyl groups such as methyl groups or by hydrogen. Thus butadiene, isoprene or piperylene may be used in the process, butadiene being particularly preferred.

Suitable nucleophilic groups AH comprise primary and secondary amino, hydroxyl, alcoholic, phenolic and carboxylic acid groups. Preferred compounds containing one or more nucleophilic groups include water, the alkylamines, particularly the lower alkylamines such as mono- and di-methylamine and mono-and di-ethylamine; mono-, di- or tri-hydric alkanols, particularly those containing up to six carbon atoms such as methanol, ethanol, ethylene glycol, diethylene glycol, propylene glycol, dipropylene glycol and glycerol; and phenols such as phenol itself, cresols, xylenols and other alkyl substituted phenols and also dihydric and polyhydric phenols, e.g. resorcinol, hydroquinone and pyrocatechol. The most favoured compounds containing one or more nucleophilic groups for use in the process, however, are carboxylic acids which may be aliphatic or aromatic mono- or di-carboxylic acids. Examples of mono-carboxylic acids are benzoic acid, toluic acid and alkanoic acids, particularly alkanoic acids containing up to 20 carbon atoms, preferably up to 6 carbon atoms, such as acetic acid. Dibasic acids which may be used include dibasic alkanoic acids, particularly those containing up to 10 carbon atoms, such as adipic, azelaic, suberic and sebacic acids and dibasic aromatic acids, particularly the three phthalic acids. In nucleophilic compounds containing two or more nucleophilic elements or groups, e.g., dihydric alcohols and dibasic acids, one or more of the groups may react with the acyclic conjugated diolefine, thereby giving rise to products containing more than one of the groups

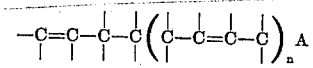

The unsaturated product of the process is derived from a dimer or lower polymer of the acyclic conjugated diolefine.

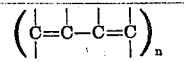

and from the nucleophilic element or group AH. The product may be an amine, derived from an amine reactant, an alcohol derived from water, an ether derived from an alcohol or phenol reactant, or an ester derived from a carboxylic acid reactant. In this latter case, for example, the group

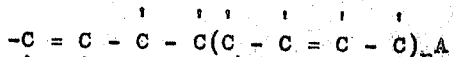

may be

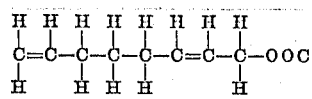

The di-esters in which $n = 1$ derived from the dibasic acids, e.g., from ortho-pathalic acid, may after hydrogenation of the olefinically unsaturated bonds be used as plasticiser esters. Thus, the di-esterderived from ortho-phthalic acid and butadiene yields after hydrogenation, di-n-octyl-orthophthalate.

Compounds of platinum or iridium may be used in the process, of these platinum is preferred. Suitable compounds of platinum or iridium include the halides, e.g., the chloride such as platinic chloride, lower alkanoates containing up to 6 carbon atoms, e.g., the acetate, organo-complexes of the metals such as the acetylacetonate and complexes with ligands such as the triphenyl phosphine ligand, e.g., tetrakis (triphenyl phosphine) platinum. The concentration of the platinum or iridium compound in the reaction solution may be $10^{-7}$ to 1.0 molar, preferably $10^{-6}$ to 1.0 molar, more preferably $10^{-5}$ to $10^{-2}$ molar.

If desired, the reaction may be carried out in the presence of carbon monoxide, i.e., by passing carbon monoxide into reaction solution or by carrying out the reaction in a sealed system under an atmosphere comprising carbon monoxide. Suitably the carbon monoxide partial pressure may be up to 10 atmospheres and is preferably in the range 0.1 to 5 atmospheres. Alternatively a carbonyl, preferably a metal carbonyl, may be present in the reaction medium, e.g., a transition metal carbonyl, particularly a Group VIII metal carbonyl such as iron carbonyl, cobalt carbonyl or a noble metal carbonyl. The concentration of such a carbonyl in the reaction medium may lie in the range $10^{-4}$ to 1.0M. Furthermore a metal carbonyl and carbon monoxide may be used together, preferably, however, carbon monoxide alone is used. We have found that the benefits conferred by the use of carbon monoxide or a metal carbonyl include improved catalyst stability and a reduction in the tendency of the product to isomerise to more highly branched chain isomers.

The reaction is preferably carried out homogeneously in the liquid phase, which may comprise an excess of one of the reactants, particularly the diolefin reactant. Alternatively an inert solvent may be present. The inert solvent may be paraffinic, e.g., a $C_6$ to $C_{12}$ paraffin or mixture of such paraffins; or aromatic, e.g., benzene, toluene or xylene; or naphthenic, e.g., cyclohexane; or polar, e.g., amides such as acetamide, dimethyl acetamide and dimethylformamide; nitriles such as acetonitrile and benzonitrile; ketones such as acetone and methyl ethyl ketone; esters such as ethylene glycol diacetate; ethers such as tetrahydrofuran and anisole and the lower alkyl ethers of monoor diethylene glycol, or a solvent such as dimethyl sulphoxide or sulpholane. When water is a reactant ketonic solvents such as acetone are particularly suitable.

The copper compound is preferably a copper salt, e.g., copper nitrate or a copper halide such as copper chloride. Preferably the copper salt is a copper alkanoate derived from a carboxylic acid containing up to 20 carbon atoms, e.g., copper acetate, copper octanoate or copper stearate. Other copper carboxylates may also be used in the process, particularly copper naphthenate. The concentration of copper in the reaction medium is preferably in the range $10^{-5}$ to $10^{-2}$ molar.

The temperature under which the process may be carried out preferably lies in the range ambient to 300°C, more preferably 50° to 150°C. In the absence of carbon monoxide the pressure is usually the autogeneous pressure of the reactants at the temperature of the reaction.

The invention will now be further described with reference to the following Examples.

EXAMPLE 1

Phthalic acid (8.3 gram, 0.05 mole), butadiene (50 mls., 0.63 mole) and benzene (20 mls.) were heated together in an autoclave under 5 atmospheres pressure of carbon monoxide in the presence of platinum acetylacetonate (3.5 mg., $8.7 \times 10^{-6}$ mole) and cupric acetate (100 mg., $5.5 \times 10^{-4}$ mole). After 10 hours at 80°C the reaction was terminated and the dissolved copper removed by shaking the reaction solution with dilute nitric acid. The organic solution was next dried and evaporated to dryness to yield di-octa-2,7-dienyl-phthalate (18.7 grams, 98% yield). The product was completely soluble in acetone indicating that there was no polymer present. In the absence of the copper salt a polymeric residue insoluble in acetone was obtained.

EXAMPLE 2

Phthalic acid (7.3 grams, 0.044 mole), butadiene (12 grams, 0.22 mole), isobutene (18 grams) and tetrahydrofuran (20 mls.) were heated in an autoclave under 5 atmospheres pressure carbon monoxide in the presence of platinous acetate (6.0 milligrams $1.8 \times 10^{-5}$ mole) solvated with tetrahydrofuran, and cupric acetate (53 milligrams, $2.9 \times 10^{-4}$ mole). After 2 hours at 120°C the solvent was evaporated, isopentane added and the precipitated phthalic acid (0,8 gram) filtered off. The conversion of phthalic acid was 89.0 percent and the product was soluble in acetone or methanol showing the absence of butadiene polymer.

We claim:

1. A process for the production of unsaturated compounds containing one or more groups

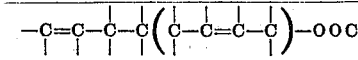

in which $n$ is 1, which consists essentially of reacting butadiene, isoprene or piperylene with an aromatic or alkanoic mono- or di- carboxylic acid in the presence of $10^{-7}$ to 1.0 molar concentration of a platinum or iridium compound and $10^{-5}$ to $10^{-2}$ molar concentration of a copper compound selected from copper nitrate, copper halide, copper naphthenate and copper alkanoate derived from a carboxylic acid containing up to 20 carbon atoms.

2. The process of claim 1 in which the platinum or iridium compound is a halide, a lower alkanoate of an acid containing up to 6 carbon atoms, or an organo complex.

3. The process of claim 2 in which the platinum or iridium compound is a platinum or iridium halide, $C_1$ to $C_6$ alkanoate, acetylacetonate, or a complexe with triphenyl phosphine.

4. The process of claim 1 when carried out in an inert solvent.

5. The process of claim 4 in which the inert solvent is selected from an aromatic hydrocarbon, a paraffin, cyclohexane or a polar solvent.

6. The process of claim 4 wherein the inert solvent is a polar solvent selected from the group consisting of acetamide, dimethyl acetamide and dimethylformamide.

7. The process of claim 1 in which the acid is a monoalkanoic acid containing up to 20 carbon atoms, a dialkanoic acid containing up to 10 carbon atoms, benzoic acid or one of the three phthalic acids.

8. The process of claim 1 in which the copper compound is copper nitrate, copper alkanoate of an acid containing up to 20 carbon atoms or copper naphthenate.

9. The process of claim 1 in which butadiene is reacted with acetic acid, adipic acid, azelaic acid, suberic acid, sebacic acid or one of the three phthalic acids in the presence of a $10^{-7}$ to 1.0 molar concentration of platinum chloride, platinum acetate, platinum acetylacetonate or a platinum complex with triphenyl phosphine at a temperature in the range ambient to 300°C, the concentration of the copper compound lying in the range $10^{-5}$ to $10^{-2}$ molar.

10. The process of claim 9 in which an inert solvent is present selected from the group consisting of benzene, toluene, xylene, a $C_6$ to $C_{12}$ paraffin, a mixture of $C_6$ to $C_{12}$ paraffins, cyclohexane, acetone, methylethylketone, dimethylformamide, acetamide, dimethylacetamide, tetrahydrofuran, anisole, acetonitrile, benzonitrile, ethylene glycol diacetate, lower alkyl ethers of mono-ethylene glycol, lower alkyl ethers of diethylene glycol, dimethyl sulphoxide and sulpholane.

11. A process for the production of unsaturated compounds containing one or more groups

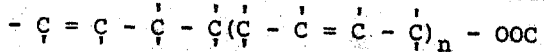

in which $n$ is 1, which consists essentially of reacting butadiene, isoprene or piperylene with an aromatic or alkanoic mono- or di-carboxylic acid containing up to 20 carbon atoms in the presence of $10^{-7}$ to 1.0 molar concentration of a platinum or iridium compound and $10^{-5}$ to $10^{-2}$ molar concentration of a copper compound selected from copper nitrate, copper halide, copper naphthenate and copper alkanoate derived from a carboxylic acid containing up to 20 carbon atoms, wherein the reaction is carried out in the presence of carbon monoxide or a transition metal carbonyl.

* * * * *